Aug. 4, 1970    SHINICHIRO OGAWA ET AL    3,523,237

DEVICE CONVERTING ELECTRIC CURRENT RATIO INTO TIME RATIO

Filed Sept. 23, 1968

INVENTORS.
SHINICHIRO OGAWA
BY TOSHIYUKI MATSUDA

ATTORNEY

United States Patent Office 3,523,237
Patented Aug. 4, 1970

3,523,237
DEVICE CONVERTING ELECTRIC CURRENT RATIO INTO TIME RATIO
Shinichiro Ogawa and Toshiyuki Matsuda, Tokyo, Japan, assignors to Honywell Inc., Minneapolis, Minn., a corporation of Delaware
Filed Sept. 23, 1968, Ser. No. 761,665
Claims priority, application Japan, Sept. 22, 1967, 42/60,555
Int. Cl. H02m 7/00; H02j 7/00
U.S. Cl. 321—15                                    1 Claim

ABSTRACT OF THE DISCLOSURE

During a change-over switch is in a position, capacitor is charged from an electrical source to store a first charge corresponding to the duration the switch is in the position. During the change-over switch is in the other position, the capacitor is charged in opposite direction from another electrical source to store another second charge corresponding to the duration the switch is in the other position. The circuit making the second charge constitutes a negative feedback circuit to the circuit making the first charge. The difference in charge stored in the capacitor becomes zero at a balanced condition so that the current performing the second charge is in proportion to the current performing the first charge by the factor of the duration in which the change-over switch is on condition, respectively.

BACKGROUND OF THE INVENTION

This invention relates to a device converting an electric current ratio into a time ratio. More particularly, it relates to a device which converts an electric current ratio $I_1/I_2$ into a time ratio $Tb/Ta$, for instance, the ratio between the two current signals $I_1$ and $I_2$ of 4–20 ma. DC.

SUMMARY OF THE INVENTION

In the invention of subject application, the device consists of a change-over switch SW which takes out the time ratio between the time $Ta$ in which the movable contact is in contact with one of the fixed contacts $a$ and the time $Tb$ in which said movable contact point is in contact with another fixed contact $b$; a differential electric charge detecting capacitor; means to obtain a DC voltage by averaging the voltages across the electrodes of the capacitor; a voltage-current converter which converts the DC voltage into an output direct current $I_0$; a first current source; a second current source; and a current comparator which compares an output current $I_2$ of the second current source with the output current of the voltage-current converter and controls the change-over operation of the change-over switch.

An object of this invention is to provide a high accuracy current operational device by composing a simple circuit which requires only a small number of components and no special types of component.

Another object of this invention is to provide a current operational device of stable performance which is capable, by adopting a negative feedback circuit, of ignoring the effects given to the device by the characteristic variations of the various components brought about by the changes in the ambient temperature and humidity.

DESCRIPTION OF THE PREFERRED EMBODIMENT

Figure 1:
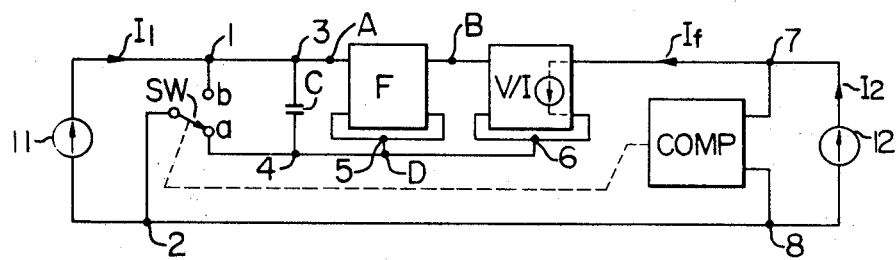
FIG. 1 is a circuit diagram showing the basic construction of the device of this invention.

In FIG. 1 C is a differential charge detecting capacitor; SW is a change-over switch as means to take out the time ratio $Tb/Ta$ which has a movable contact switching repeatedly at a cycle of $Ta+Tb$, a fixed contact $a$ with which the movable contact is in contact during the time $Ta$ in a cycle of $Ta+Tb$ time, and another fixed contact $b$ with which the movable contact is in contact during the remaining time $Tb$; F is a low-pass filter which has a high input impedance, has a pair of its input terminals connected respectively to the two electrodes of the above-mentioned differential charge detecting capacitor and is used as means to average the voltages $v_A$ across the electrodes corresponding to the accumulated charges of said capacitor and to obtain a DC voltage $v_D$ across a pair of its output terminals; and $V/I$ is a voltage-current converter (given a sign for the current source as it can be considered as such) which converts said DC voltage $v_D$ into a DC current $I_f$ of the proportionate magnitude, one of its paired output terminals is connected to a fixed contact $a$ of the above-mentioned change-over switch SW through connecting points 6, D and 4 and another terminal is connected to one of the input terminals of a current comparator COMP through a connecting point 7. Another input terminal of the current comparator COMP is connected to the movable contact of the above-mentioned change-over switch SW through connecting points 8 and 2.

11 is a first current source and its paired output terminals are connected respectively to the fixed contact $b$ and the movable contact of the change-over switch SW. 12 is a second current source and its paired output terminals are connected in parallel to the pair input terminals of the current comparator COMP. The output circuit of the current comparator COMP is electrically connected to the change-over switch SW.

The direction of connection of these current sources are as follows. In case the positive output terminal of first current source 11 is connected to the fixed contact $b$ of the change-over switch SW (see FIG. 1), the positive output terminal of the voltage-current converter is connected directly to the other fixed contact $a$ of the change-over switch SW and the positive output terminal of second current source 12 is directly connected to the negative output terminal of the voltage-current converter $V/I$.

Conversely, in case the negative output terminal of first current source 11 is connected directly to the fixed contact $b$ of the change-over switch SW (see FIG. 3), the negative output terminal of the voltage-current converter $V/I$ is directly connected to the other fixed contact $a$ of the change-over switch SW and the negative output terminal of second current source 12 is directly connected to the positive output terminal of the voltage-current converter $V/I$.

Figure 2:
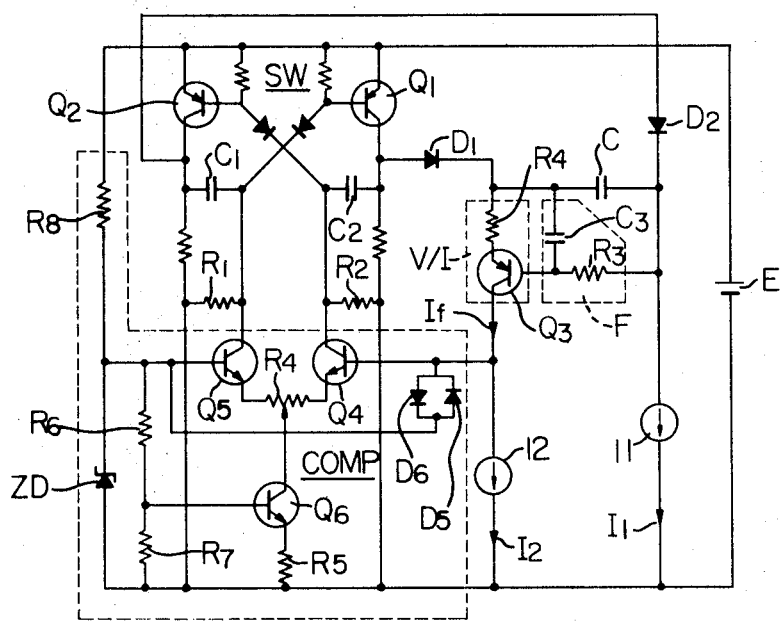
FIG. 2 is an embodiment of the circuit diagram of the device of this invention.

FIG. 2 shows the low-pass filter F which has a high input impedance and is composed of a capacitor C3 and a resistor R3; the voltage-current converter $V/I$ which is composed of a PNP transistor Q3 and a resistor R4 connected to the emitter of the transistor Q3; the change-over switch SW which is composed of an astable multivibrator, including PNP transistors Q1 and Q2, coupling capacitors C1 and C2, resistors R1 and R2, and reverse current preventive diodes D1 and D2; and the current comparator COMP which is composed of a current drive type differential amplifier consisting of NPN transistors Q4 and Q5, an adjusting variable resistor R4, a PNP transistor Q6, resistors R5, R6, R7 and R8, a constant-voltage diode ZD, and diodes D5 and D6; and they are connected with a common DC voltage source E, first current source 11, second current source 12 and a differential charge detecting capacitor C to form a circuit according to this invention.

The operation of this invention is explained. First, during the time $Ta$ while the change-over switch SW is holding its movable contact to the fixed contact $a$, the DC current $I_1$ from first current source 11 flows in one direction into the differential charge detecting capacitor C and the charge $I_1 Ta$ is accumulated in it. Then, if the change-over switch SW switches its movable contact to the other fixed contact $b$ and maintains the contact for $Tb$ time, the output current $I_f$ from the voltage-current converter $V/I$ flows into the differential charge detecting capacitor C in the reverse direction relative to the direct current $I_1$ through the current comparator COMP and the charge $I_f T_b$ is accumulated.

Accordingly, during the time of a cycle $Ta+Tb$, the following differential charge will be accumulated in the differential charge detecting capacitor C.

$$\Delta Q = I_1 T_a - I_f T_b \tag{1}$$

As evident from the explanation on the above circuit composition, owing to the feedback circuit contained in it, when the differential charge $\Delta Q > 0$, the mean DC voltage $v_D$ of the voltages $v_A$ across the electrodes of the capacitor C increases and the output current $I_f$ of the voltage-current converter $V/I$ increases, and when conversely $\Delta Q < 0$, the output current $I_f$ decreases; thus finally the circuit automatically attains an equilibrium state of $\Delta Q = 0$ and maintains it. Therefore, the relation of $I_1 T_a = I_f T_b$ is maintained in the equilibrium state and the output current $I_f$ can be obtained, as shown by the following formula, by multiplying the current $I_1$ of first current source 11 by the time ratio $Ta/Tb$.

$$I_f = \frac{Ta}{Tb} I_1 \tag{2}$$

This means that the circuit components other than the current comparator COMP and the second current source function so as to multiply the first direct current $I_1$ by the time ratio $Ta/Tb$.

Next, when we pay attention to circuit parts of the current comparator COMP, second current source 12 and the voltage-current converter $V/I$, we shall observe that the second direct current $I_2$ and the output current $I_f$ of the voltage-current converter $V/I$ flows in the mutually opposite directions into the current comparator at its input terminal. The current comparator receives the differential current $\Delta I = I_2 - I_f$ between these currents as the input, and when $\Delta I > 0$, it generates in its output circuit such a signal as will increase the time ratio $Ta/Tb$ and when conversely $\Delta I < 0$, such a signal as will decrease the time ratio $Ta/Tb$; and accordingly, this output circuit controls the operation of the change-over switch.

Consequently, owing to the automatic balancing circuit composed of these circuit components, when $\Delta I > 0$, the output current $I_f$ increases as evident from the Formula 2, and when conversely $\Delta I < 0$, the current $I_f$ decreases; in either case, the state of $\Delta I = 0$ is attained automatically and this state of equilibrium is maintained. Therefore, we can obtain $$I_2 = I_f \tag{3}$$

From the Formulas 2 and 3, the relation $$I_2 = \frac{Ta}{Tb} I_1$$

can be established which can be written as follows.

$$\frac{Tb}{Ta} = \frac{I_1}{I_2} \tag{4}$$

As shown by the Equation 4, the above relation indicates that the ratio between the input current $I_1$ and the other input current $I_2$, $I_1/I_2$, can be converted into the time ratio $Tb/Ta$.

We claim:

1. A device to convert a current ratio $I_2/I_1$ into a time ratio $Ta/Tb$ comprising; a differential electric charge detecting capacitor; a change-over switch having two fixed contacts to be connected respectively to the two electrodes of said capacitor and a movable contact which can be switched to contact said two fixed contacts respectively for the time $Ta$ and $Tb$; a current comparator controlling said change-over switch; a first current source connected to said capacitor only while the movable contact of said change-over switch is in contact with a specified one of said fixed contacts and charges said capacitor in one direction; means averaging the voltages across said electrodes corresponding to the accumulated charges of said capacitor to obtain a DC voltage; a voltage-current converter converting said DC voltage into an output current having a corresponding magnitude and forming a negative feedback circuit connected to said differential charge detecting capacitor through said current comparator only while said change-over switch holds its movable contact in contact with the other fixed contact; and a second current source connected to said current comparator so that the output current $I_2$ of said second current source can be compared with the output current of said voltage-current converter.

References Cited

UNITED STATES PATENTS

| | | | |
|---|---|---|---|
| 2,449,077 | 9/1948 | Lindenblad | 321—49 XR |
| 2,781,490 | 2/1957 | Mitchell et al. | |
| 3,199,014 | 8/1965 | Putzrath | 320—1 |
| 3,371,232 | 2/1968 | Hannan et al. | 320—1 XR |
| 3,435,317 | 3/1969 | Osborn | 320—1 |

WILLIAM M. SHOOP, JR., Primary Examiner

U.S. Cl. X.R.

320—1